March 2, 1971  G. W. STILLEY ET AL  3,567,416
METHOD OF PRESS BENDING GLASS SHEETS
Filed Jan. 19, 1968  2 Sheets-Sheet 1
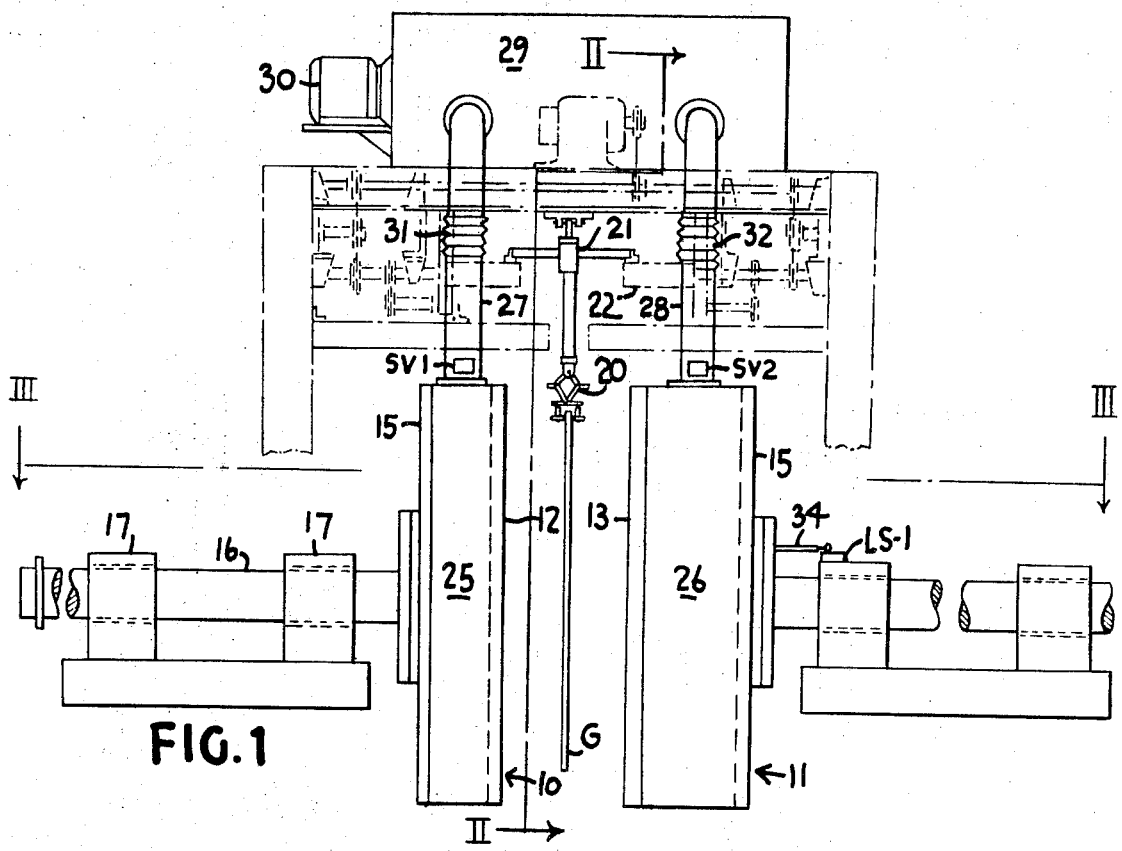
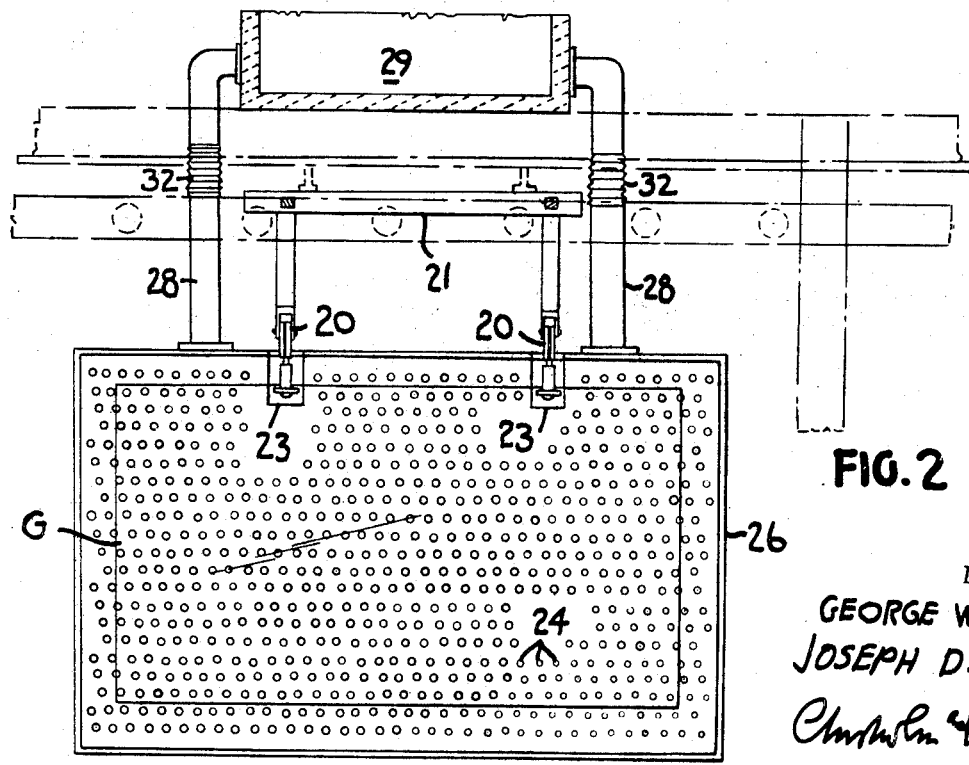
INVENTORS
GEORGE W. STILLEY
JOSEPH D. KELLY
ATTORNEYS

INVENTORS
GEORGE W. STILLEY
JOSEPH D. KELLY

BY
ATTORNEYS

United States Patent Office 3,567,416
Patented Mar. 2, 1971

3,567,416
METHOD OF PRESS BENDING GLASS SHEETS
George W. Stilley, Freeport, and Joseph D. Kelly, Cheswick, Pa., assignors to PPG Industries, Inc., Pittsburgh, Pa.
Filed Jan. 19, 1968, Ser. No. 699,131
Int. Cl. C03b 23/02
U.S. Cl. 65—106                                              4 Claims

ABSTRACT OF THE DISCLOSURE

Press bending glass sheets between shaping molds having controlled temperature during the press bending operation. The temperature of the molds is controlled within a temperature range such that when the molds engage the glass surfaces shaping the latter, they cool the glass surfaces at approximately the same cooling rate as the ambient atmosphere in spaces throughout the mold faces.

---

This invention relates to press bending glass sheets and particularly relates to press bending a glass sheet that has been heated immediately previously to an elevated temperature at which the glass is readily deformed by engaging the opposite major surfaces of the glass sheet while still at a deformation temperature between a pair of complemental shaping molds which move toward the glass sheet to impose their shape onto the opposite major surfaces of the sheet and then retract. The glass is usually chilled immediately after the shaping operation by applying cold air blasts against the opposite surfaces at a rate sufficently rapid to temper the glass sheets.

The glass sheet usually is gripped by tongs which are suspended from carriages that convey the tongs and glass sheets gripped thereby first through a tunnel-like furnace, where the glass is heated to its deformation temperature; then to a shaping station, where the glass movement is stopped while the complemental shaping molds engage the opposite glass sheet surfaces to shape the glass sheet; and finally to a cooling area where chilling blasts of fluid are applied against the opposite surfaces of the bent glass sheet sufficiently rapidly to impose a temper therein. The cooling area may be located either at the shaping station or at a chilling station located further down the path along which the glass sheets are conveyed.

Alternatively, the glass sheets may be supported along their lower edge on glass conveying elements while balanced between equal flows of fluid applied along opposite surfaces as described and claimed in U.S. Pat. No. 3,341,313 to Robert W. Wheeler and Charles R. Davidson, Jr., or on a carriage that supports the lower edge and has means for loosely engaging the upper edge portion of the glass sheet to balance the latter in upright position, as in U.S. Pat. No. 3,298,809 to Herbert W. Barch and Clement E. Valchar. The present invention is also susceptible of use in bending glass sheets that are oriented horizontally and conveyed into and/or out of the shaping station on a roller or other type of conveyor as in U.S. Pat. No. 3,374,080 to Robert W. Wheeler, or on a gaseous support as described in U.S. Pat. No. 3,223,501 to James C. Fredley and George W. Sleighter, or a carriage or any combination of the latter.

U.S. Pat. No. 3,279,906 to Robert N. Baker discloses apparatus for press bending and tempering glass sheets. The shaping molds of this patent are provided with press faces having apertures extending through the press faces of the shaping molds for applying chilling fluid against the opposite surfaces of the bent glass before the latter leaves the shaping station.

The patent describes the apertures as round holes, preferably between one-sixteenth and one-eighth inch in diameter that are spaced apart in staggered rows and columns about 1¼ inches apart. Limiting the size of the openings relative to the space between adjacent openings keeps the openings from marking the glass during the press forming operation.

However, when using such small apertures at such a wide spacing between apertures, an air pressure within the air chambers of about 9 pounds per square inch is required to temper the glass when quenched with cold air through such apertures in shaping faces of such pressing molds retracted 3 to 4 inches from the glass. Such a high pressure through such small holes causes the glass to develop an iridescent pattern in the form of an irregular checkerboard conforming somewhat to the arrangement of the openings in the pressing mold.

Also, applying blasts of quenching fluid at such a rapid rate causes the glass sheet to swing uncontrollably when the shaping molds are retracted. The patentees found it necessary to apply the quenching air blasts in an oblique downward direction to limit this swinging. However, such oblique blasts chill the glass at a less efficient rate than blasts directed normal to the glass surfaces, thus requiring larger compressors to supply air blasts at greater velocities to chill the glass sufficiently.

The present invention has determined that this swinging occurs when chilling air blasts are started while the shaping molds engage the glass. The bent glass cools at a faster rate than the shaping molds. Therefore, the concavely shaped surface of the glass embraces the convex shaping mold when the molds begin to retract and the glass sheet swings in the direction the convex mold retracts until the force of the air blasts applied through the concave shaping mold is reduced at the convex glass surface by dissipation through the intervening air space while the force of the air blasts applied through the convex shaping mold against the concave glass surface remains undiminished until the difference in pressure against the opposite curved glass surfaces exceeds the embracing force between the glass and the convex pressing mold. This pressure difference overcomes the embracing force and causes the bent glass sheet to swing back toward the concave shaping mold. This swinging continues as long as the glass is subjected to opposing air blasts because of the dynamic nature of the system.

According to the present invention, such swinging is reduced by applying blasts of gas through the shaping molds at substantially the same temperature as the mold temperature before the molds begin to retract from the shaped glass. Hot gas is applied to the hollow apertured pressing molds at a temperature within a temperature range of between 600 and 750 degrees Fahrenheit when the molds engage a heat-softened glass sheet for shaping, thereby controlling the mold temperature within said temperature range. As the molds retract from the bent glass sheet, the hot blasts of gaseous products pass through the apertures of the molds with equal force against both major surfaces of the glass, thereby holding the glass in substantially a midplane between the retracting molds.

Controlling the mold temperature within the range specified is believed to bring the mold, the hot glass surfaces and the ambient space between the shaping molds and the glass at a substantially equilibrium temperature during the shaping operation and immediately thereafter when the molds begin to retract from the glass. The molds cool the opposite surfaces of the glass sheet during the period of engagement (about 2 to 4 seconds for vertically supported glass and about 4 to 10 seconds for horizontally supported glass) at approximately the same rate as the glass sheet cools as a result of its exposure to ambient conditions at the shaping station.

Such temperature control has been found to affect the appearance of the glass sheet surfaces. When the molds are too cold (below the specified temperature range), the hot glass surface freezes in an expanded state and depressions or dimples form in those regions facing the apertures of the mold face. When the molds are too hot (above the specified temperature range) when they engage the hot glass during the press bending operation, the glass sheet regions facing the apertures expand outward and form small protrusions or small hills similar in appearance to pimples. Both the depressions and the protrusions mar the optical clarity of the bent glass.

Furthermore, if the blasts of chilling medium are blown against the major glass sheet surfaces through the mold face apertures while the molds are engaging the glass, the bent glass develops defects due to nonuniform chilling of the glass. Under these circumstances, the molds are hotter than the cold air blasts and so the glass regions facing the apertures or cold air blasts are frozen in an expanded state to form pimples or protrusions extending from the remainder of the glass surface that faces the relatively hot mold.

Another aspect of the present invention involves applying fluid into the hollow mold chambers at a temperature within the temperature range during both the press bending operation and for a brief interval (about 1 to 2 seconds) thereafter sufficient to disengage the bent glass from its embrace with the molds. When the temperature of the applied fluid escaping through the apertures does not vary greatly from the mold surface temperature, such a condition substantially eliminates having the glass develop a nonuniform surface temperature that results in either protrusions or depressions.

The benefits of the present invention will be better understood in the light of a description of apparatus conforming to the present invention that follows. In the drawings that form part of the description and wherein like reference numbers refer to like structural elements, FIG. 1 is a schematic side elevation of a pair of press bending molds having apertured press faces according to the present invention;

FIG. 2 is a view along lines II—II of FIG. 1 showing a front elevation of one of the press bending molds;

Figure 4:
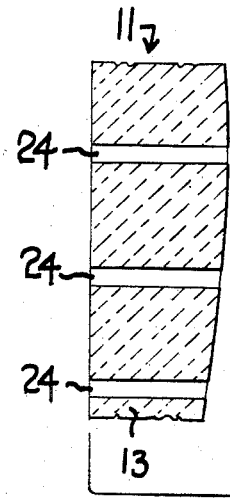
Figure 5:
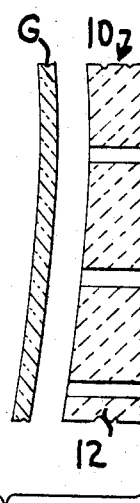
Figure 6:
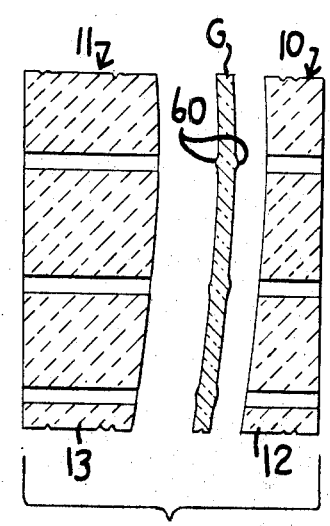

FIG. 4 is an enlarged, fragmentary, sectional view of a portion of a glass sheet showing the relation of its major surfaces to the apertures in the shaping molds when the mold temperature is within the desired temperature range during the shaping operation; and FIGS. 5 and 6 are views similar to FIG. 4, FIG. 5 showing the appearance of depressions in the surface of a glass sheet press bent when the molds are colder than the desired temperature range, and FIG. 6 showing protrusions that form in the bent glass sheet surface when the molds are hotter than the desired temperature range during the shaping of the glass and the first instant after retraction begins.

Referring to the drawings, a pair of press bending molds 10 and 11 are shown having complementary shaping surfaces. Mold 10 has a convex outer surface formed on a wall 12 while mold 11 has a concave outer surface formed on an opposing wall 13. The outer surfaces of walls 12 and 13 conform to the shape desired for the glass sheet after bending.

The molds are preferably open boxes with their glass facing walls 12 and 13 formed of a refractory material, preferably one having a coefficient of heat conductivity between 3 and 4 British thermal units per hour per square foot of area per degree Fahrenheit difference per inch of thickness. A refractory material having about 99 percent by weight of fused silica in a heat resistant binder sold by the trade name of "Glass Rock" and another sold under the trade name of "Masrock" are ground to the desired curvature and drilled to produce apertured pressing mold faces.

Other acceptable materials comprise a mixture of a fused silica grog in a calcium aluminate cement. The latter molds are produced by casting the latter mixture after mixing with 12 percent by weight of water against the smooth surface of a sheet of glass in a mold shaped to the desired curvature at room temperature and letting the material set overnight. The set mixture is heated at a rate of 20 to 25 degrees Fahrenheit in a closed kiln until it reaches a temperature of about 2100 degrees Fahrenheit. After about 3 hours of exposure to the latter temperature, the kiln fires are extinguished and the mold permitted to cool naturally within the closed kiln. After 3 to 4 days, the piece is cooled to handling temperature and is capable of withstanding repeated engagements with glass sheets heated to a working temperature of between 1200 and 1300 degrees Fahrenheit without any distortion during press bending operations.

Each box forming one of the molds 10 or 11 has a pair of metal side walls 14 closed by a metal rear plate 15 to which are attached telescoping guides 16 received in sleeves 17. Pneumatic rams 18 (FIG. 3) are provided for pressing the molds together to shape the glass and for retracting the molds to remove the bent glass.

A sheet of glass G to be shaped is supported by at least two glass tongs, one tong 20 being shown. The tongs are suspended from carriages 21. The latter are mounted for movement along a horizontally extending track 22 leading from a furnace (not shown) adapted to heat the glass to its softening temperature before it is positioned between the molds for press bending. The molds 10 and 11 are provided with notches 23 (FIG. 2) to provide clearance for the tongs 20 upon closing the molds so that the molds do not touch the tongs.

The shaping surfaces of the molds 10 and 11 are provided with a multiplicity of holes 24 which extend completely through the thickness of the walls 12 or 13 from orifices at the shaping surface into an enclosed chamber 25 or 26 within each mold. The holes 24 are arranged in a uniform pattern along the entire shaping surface of each mold and are drilled after the front walls 12 and 13 are cast and fired and cooled to handling temperature. Flexible air conduits 27 and 28 introduce hot gas into the chambers 25 and 26 within the molds 10 and 11 respectively, so as to produce pressure within the chambers. A gas burner 29 and a blower 30 are provided to supply the hot gas under pressure. Flexible connectors 31 and 32 permit some mold movement relative to the burner 29 without impairing the ability of the air conduits to supply pressurized gas to the mold boxes 10 and 11.

Figure 3:
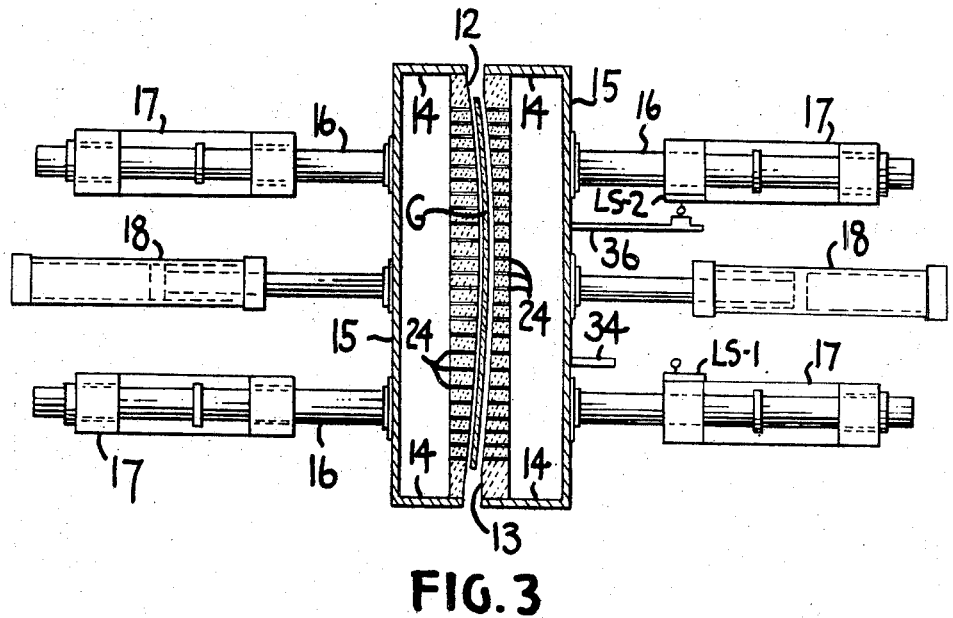
FIG. 3 is an enlarged cross section along the lines III—III of FIG. 1, showing the shaping molds engaging a glass sheet therebetween during its press shaping.

Preferably, the holes 24 are located in the shaping surfaces of the molds so as to impinge hot gas under pressure against the opposite major surfaces of the glass with each hole of one mold directly opposite the corresponding hole of the other mold, as indicated in FIG. 3. The hot gas forms a buoyant layer along each major glass sheet surface.

At least one of the molds is provided with a series of fingers 34, 36, etc., for actuating various limit switches LS-1, LS-2, etc., in response to the movement of the molds during a press bending operation in a manner well known in the art. By way of example, finger 34 may actuate limit switch LS-1, finger 36 may actuate limit switch LS-2, (FIG. 3) at various stages of the operation to control the operation of blower 30 and solenoid valves SV-1 and SV-2 at predetermined times during a pressing and retracting cycle in a manner well known in the art of controlling the timing sequence of various operations.

In practicing the present invention, a sheet of glass is first heated to softening temperature while vertically suspended by two or more tongs 20 supported from the carriage 21 conveyed along track 22. The molds 10 and 11 are mounted close to the furnace exit and initially are open to receive a glass sheet delivered from the furnace at a temperature sufficiently high to be readily deformed.

The glass sheet G, supported by the tongs 20, is stopped while in alignment between the molds and the molds are quickly closed by means of the pneumatic rams 18. These molds close on substantially the entire area of the glass sheet major surfaces so as to shape the glass to the curvature of the mold shaping surfaces. It has been found that by controlling the temperature of the molds in the manner described herein, the glass can be shaped without marking the surface of the glass. FIG. 4 shows a typical glass sheet portion when the glass sheet is shaped between molds within the suggested temperature range of 600 to 750 degrees Fahrenheit.

After press bending the glass sheet G, the molds are withdrawn a short distance, about 1 inch between the molds. The hot gas escapes through the mold apertures 24 of both pressing molds 10 and 11 at a controlled temperature within the desired temperature range. The glass surfaces are thus impinged by hot gas having a temperature that differs from that of the molds by an insignificant amount. The glass is maintained in balanced relation between the retracting molds and its swinging is minimized by the balanced flow of hot fluid. The hot air flow is stopped by having finger 36 actuate solenoid valves SV–1 and SV–2 by engaging limit switch LS–2 when the molds retract about 0.1 to 0.25 inch from the glass.

If the glass is to be tempered at the shaping station, cold air is applied through vertically movable quenching frames of the type disclosed in U.S. patent application Ser. No. 574,636 of George E. Yockey by having finger 34 engage limit switch LS–2 to actuate elevation of the quenching frames. If the glass is chilled outside the shaping station, the conveyor is actuated (through a suitable timer circuit having a predetermined time delay and whose timing cycle is initiated by a selected limit switch) to move the glass out of the shaping station and into a quenching station at once. The onset of hot gas begins again when the bent glass sheet leaves the shaping station to enable the molds and the gas to regain equilibrium temperature by the time a succeeding hot glass sheet reaches the shaping station for a succeeding press bending operation.

Experiments performed with glass sheets having nominal thicknesses ranging between about ⅛ inch and about ¼ inch show that such glass sheets pressed between apertured molds at mold temperatures in the suggested range of between about 600 and 750 degrees Fahrenheit have smooth surfaces like those seen in FIG. 4. However, molds that engaged glass sheets while at mold temperatures below the suggested range produced observable recesses 50 facing each opening as depicted in FIG. 5. However, when the mold temperatures were above the temperature range on contacting the glass, protuberances 60 of the type shown in FIG. 6 resulted.

The size of the recesses 50 or protuberances 60 in the surfaces of the bent glass appeared to increase with greater variation of the mold temperature from the desired temperature range. There did not appear to be any significant difference in appearance between glass sheets of different thicknesses in the thicknesses tested provided the molds were within the desired temperature range during shaping. In other words, there did not appear to be any significant difference in temperature range required for the molds tested to prevent the formation of observable protuberances or recesses in the major surfaces of the bent glass sheets in nominal thicknesses ranging from ⅛ inch to ¼ inch.

The form of the invention described above represents an illustrated preferred embodiment. It is understood that various changes may be made without departing from the spirit of the invention as defined in the claimed subject matter that follows.

What is claimed is:

1. In the art of press bending a glass sheet by heating said sheet to a deformation temperature range at which it is susceptible of deformation and sandwiching said sheet while at said temperature range between a pair of shaping molds movable relative to one another between a glass engaging position and a retracted position, said molds having complemental shaping surfaces conforming to the shape desired for the opposite major surfaces of said glass sheet after bending, and wherein at least one of said molds comprises an open box including a wall having apertures distributed throughout its extent, said apertures extending throughout the thickness of said wall and terminating in orifices directly facing said sheet, the improvement comprising applying hot gas under pressure into said box to provide hot gas blasts through said orifices directly against a surface of said sheet at a gas temperature range above a temperature at which said deformable glass sheet develops observable recesses in its surface portions engaging said orifices when said molds engage said deformable glass sheet and below a gas temperature at which said deformable glass sheet develops observable protuberances in its surface portions engaging said orifices when said molds engage said deformable glass sheet, while engaging the apertured wall directly against the major surface of said sheet and while said sheet is at least at said deformation temperature range.

2. The improvement as in claim 1, wherein both said molds are apertured, further including applying hot blasts at said gas temperature range through the apertures of both said shaping molds toward the opposite major surfaces of said heat-softened glass sheet when said molds engage said glass sheet.

3. The improvement as in claim 2, wherein said hot blasts are applied at a temperature range of between 600 and 750 degrees Fahrenheit.

4. The improvement as in claim 2, including the step of discontinuing to apply said hot blasts at said temperature range against said deformable glass sheet when said shaping molds are disengaged from said glass sheet surfaces.

References Cited

UNITED STATES PATENTS 3,421,875  1/1969  Kirkman _____ 65—106X

ARTHUR D. KELLOGG, Primary Examiner

U.S. Cl. X.R.

65—104